(12) United States Patent
Humphrey

(10) Patent No.: US 7,137,588 B2
(45) Date of Patent: Nov. 21, 2006

(54) BALLISTIC TARGET DEFENSE SYSTEM AND METHODS

(75) Inventor: John Morgan Humphrey, Los Gatos, CA (US)

(73) Assignee: United Technologies Corporation, Hartford, CT (US)

( * ) Notice: Subject to any disclaimer, the term of this patent is extended or adjusted under 35 U.S.C. 154(b) by 254 days.

(21) Appl. No.: 10/752,055

(22) Filed: Jan. 6, 2004

(65) Prior Publication Data

US 2006/0169831 A1    Aug. 3, 2006

(51) Int. Cl.
*F41G 7/00* (2006.01)
*F42B 15/01* (2006.01)
*B64G 1/24* (2006.01)
*B64G 1/00* (2006.01)

(52) U.S. Cl. .................. 244/3.15; 244/3.1; 102/374; 89/1.11; 342/61; 342/62

(58) Field of Classification Search ............... 89/1.11; 244/3.1–3.3, 158.1, 171.1–171.6; 342/61, 342/62, 175, 195; 102/374–381

See application file for complete search history.

(56) References Cited

U.S. PATENT DOCUMENTS

| 5,788,179 | A | * | 8/1998 | Wicke | 244/3.15 |
| 5,811,788 | A | * | 9/1998 | Wicke | 244/3.1 |
| 6,209,820 | B1 | * | 4/2001 | Golan et al. | 244/3.15 |
| 6,666,401 | B1 | * | 12/2003 | Mardirossian | 244/3.11 |

FOREIGN PATENT DOCUMENTS

FR        2833722 A1 *  6/2003

OTHER PUBLICATIONS

L.W. Grau et al., "Maintaining Friendly Skies: Rediscovering Theater Aerospace Defense"; Aerospace Power Journal; Summer 2002; Jun. 3, 2002; no publisher given; no publication place given; posted on Internet at www.airpower.maxwell.af.mil.*

Boost-Phase Intercept—Not If, But When, 4 pgs., Richard L. Garwin, Jul. 2000, http://www.fas.org/rlg/rlg0710NMD_TEXT.hum.

Boost-Phase Intercept, 3 pgs., http://www.fas.org/spp/starwars/program/bpi.htm.

* cited by examiner

*Primary Examiner*—Bernarr E. Gregory
(74) *Attorney, Agent, or Firm*—Wall Marjama & Bilinski LLP

(57) ABSTRACT

A method for ballistic target defense including identifying a launched ballistic target having a target launch point, a target launch direction, a target speed, and a target trajectory; launching a target interceptor in a launch direction that is generally the same as the target launch direction and with a speed that is less than the target speed; providing the interceptor with an approximate target intercept trajectory; and accelerating the interceptor at an approximate point of intercept to substantially match the target trajectory. During a relatively long target engagement time, the interceptor has approximately a zero net relative velocity with respect to the target. The interceptor will have a speed change capability sufficient to maneuver the interceptor around and/or in a target object cloud, providing the interceptor with the ability to inspect an object of the object cloud, capture an object of the object cloud, nondestructively engage in object of the object cloud, and/or destructively engage in object of the object cloud. Embodiments are also directed to a ballistic target defense system and a ballistic target interceptor.

48 Claims, 3 Drawing Sheets

BALLISTIC TARGET DEFENSE SYSTEM AND METHODS

BACKGROUND OF THE INVENTION

1. Field of the Invention

Embodiments of the invention generally relate to ballistic target defense and, more particularly, to anti-ballistic missile defense systems and methods that are non-provocative, accurate and reliable.

2. Description of Related Art

Ballistic missile defense (BMD) is one of the most technically challenging aerospace endeavors, and is of great strategic importance to many countries. The traditional approach to BMD employed by the United States of America, for example, evolved from the threat of USSR long-range bomber attack using land based missiles such as the NIKE, in a frontal attack scenario. The relatively large target size and comparatively slow speed of manned bombers enabled a frontal attack by land based anti-aircraft missiles to achieve a high kill probability. When the strategic threat shifted from bombers to Intercontinental Ballistic Missiles (ICBMs) in the 1960's, the frontal attack approach was retained for anti-ICBM defense with systems such as SPARTAN and SPRINT, two historic missiles related to the U.S. ABM defense system. However, the extremely small size of an ICBM warhead, its much greater hardness compared to that of a manned bomber, its flight environment for all but the launch and termination portions of its trajectory and, in particular, its much higher closing speed dramatically increased the difficulty of a successful frontal intercept.

The high kinetic energy of an ICBM warhead offers an approach to turn its high flight speed into a defensive advantage. At ICBM trajectory speeds of approximately 20,000 feet per second, the kinetic energy of each pound of the warhead is several times the energy of chemical explosives. Therefore, contact with any reasonably sized solid object will cause the warhead to vaporize. This physical principal has led to the development of sophisticated sensor and precision trajectory technologies required to "hit a bullet with a bullet" in a direct frontal attack. This approach of turning the target's high kinetic energy against itself enables a relatively small interceptor missile to accomplish the ballistic missile defense mission because the required interceptor speed change capability, $\Delta V$, can be substantially less than the ICBM $\Delta V$, and because the sufficient interceptor impact mass can be small compared to the mass of the ICBM warhead. Thus, the frontal attack kinetic energy approach to BMD trades the advantages of a potentially smaller interceptor missile and payload for the sensor and guidance challenges of locating and then hitting a ballistic missile warhead with closing speeds in excess of 20,000 feet per second.

Despite advances in sensor technology that have undoubtedly increased the kill probability of the frontal intercept approach to ballistic missile defense, defensive counter measures also continue to be developed. These counter measures may include, for example, the use of decoys such as balloons, locating warheads in a decoy, chilling or heating the decoys to mask their thermal signature, adding divert propulsion to the warhead, or adding an offensive capability that launches a mask in front of the warhead to destroy the interceptor's payload.

In recognition of the importance of ballistic missile defense and the challenges associated therewith, there is a need for an alternative BMD system and approach that utilizes existing and developing technology in tracking, guidance, and communications, and which is more reliable, accurate and cost effective than past approaches and those currently in use.

SUMMARY OF THE INVENTION

Embodiments of the invention are directed to ballistic target defense systems and methods.

An embodiment according to the invention is directed to a ballistic target defense system that includes an interceptor launch platform and an interceptor capable of being launched from the launch platform. According to an aspect of the embodiment, the interceptor launch platform is selectively and moveably located in a location range from proximate a target launch point location to approximately a target trajectory mid-point location; that is, some distance in front of or behind the trajectory mid-point projected vertically down to the earth's surface. In an aspect, the interceptor launch platform is in a location that is equal to or less than between about one-quarter to one-third of the target ballistic range from the target launch point. In one aspect, the ballistic target defense system interceptor launch platform is a sea-based platform. In an alternative aspect, the launch platform is a land-based platform.

The interceptor will include a propulsion system and a battle station. The interceptor will have a launch direction that is generally the same as a launch direction of a launched ballistic target. In an aspect of the embodiment, the interceptor is a multi-stage interceptor and includes at least one propulsion stage and a battle station stage. The interceptor will be capable of at least three distinct propulsive maneuvers including (a) a lower trajectory flight portion for putting a stage of the interceptor into a trajectory that intercepts a launched ballistic target, (b) an upper trajectory flight portion for precisely changing the interceptor speed or velocity as necessary to substantially match a trajectory of the launched target, and (c) a positioning flight portion for selectively positioning the interceptor proximate a target object cloud during an engagement time of the interceptor. According to an aspect of the embodiment, the battle station stage of the interceptor includes an attitude control and a propulsion capability sufficient for maneuvering the battle station stage around and within a target object cloud. In another aspect, the battle station stage includes a control system that provides the capability for a non-engagement maneuver, a non-destructive engagement, and/or a destructive engagement of an object in the target object cloud.

In another embodiment, a method for ballistic target defense includes the steps of identifying a launched ballistic target having a target launch point, a target launch direction, a target speed, and a target trajectory, launching a target interceptor in a launch direction that is generally the same as the target launch direction and with a speed that is less than the target speed; providing the interceptor with an approximate target intercept trajectory, and accelerating the interceptor at an approximate point of intercept to substantially match the target trajectory. According to an aspect of the embodiment, the interceptor is intended to afford a relatively long target engagement time during which the interceptor will have an approximately zero net relative velocity with respect to the target, such that the interceptor location will be proximate the in-flight target location. During the engagement time, the interceptor would be maneuverable around and/or in a target object cloud thus providing the interceptor with the ability to inspect an object of the object cloud, capture an object of the object cloud, nondestructively engage an object of the object cloud, and/or destructively engage an object of the object cloud. The term "target object cloud" may be used hereinafter to refer to a target warhead, a plurality of target warheads, one or more target decoy objects, or merely the in-flight target itself. During at least a portion of the engagement time, the interceptor may be controlled to have an optimal engagement distance and an optimal engagement attitude and orientation with respect to the target object cloud. According to an aspect of the embodiment, the interceptor would be provided with a trajectory having a range that is less than the ballistic range of the target. In another aspect, the interceptor may be controlled to have an engagement time that is approximately equal to or less than about one half of the flight time of the target. According to another aspect, the interceptor will be provided with a forward-based launch location that is equal to or less than between about one-quarter to one-third of the target ballistic range from the target launch point. Within the interceptor launch point range, the launch point can be located so as to provide an increased/decreased target launch warning time and an increased/decreased interceptor engagement time. In a more general aspect, the interceptor launch platform may be located in a location range from proximate a target launch point location to approximately a mid-point target trajectory location, as described above. It will be appreciated that the interceptor will not be launched toward the target launch point location, but rather in the same direction as the launched target. This scenario identifies the system and method embodiments herein as being non-provocative. In a conceptually similar manner, the relatively long engagement time afforded by the interceptor supports, at least initially, a reconnaissance mission scenario rather than that of a combat mission.

Another embodiment according to the invention is directed to a method for ballistic target defense that includes providing an interceptor having a capability to execute at least three propulsive maneuvers, including (a) injecting a stage of the interceptor into a trajectory that intercepts a launched ballistic target, (b) precisely changing the interceptor velocity as necessary to substantially match a trajectory of the launched target, and (c) selectively positioning the interceptor proximate a target object cloud, wherein the interceptor is launched in a direction that is generally the same as the launched direction of the ballistic target. In an aspect of this embodiment, the interceptor will have at least one stage that is provided with the capability for attitude control and propulsion that is sufficient to maneuver the stage around and within the target object cloud during at least a portion of the engagement time. Control will be provided to maneuver the stage of the interceptor to positions proximate the target, including in front of, behind, above, below, or along side of the target object cloud, as desired to achieve mission objectives. The step of precisely changing the interceptor velocity includes making any necessary plane change between the initial interceptor trajectory and the target trajectory. According to the embodiment, the interceptor will be provided with an injection stage speed that is less than the in-flight speed of the target.

Another embodiment of the invention directed to a method for ballistic target defense includes the steps of identifying a launched ballistic target having a target launch direction, launching an interceptor in a launch direction that is generally the same as the target launch direction, allowing a stage of the interceptor to coast without propulsion for a calculated period of time, and accelerating a stage of the interceptor to substantially match the target trajectory, wherein the interceptor and the target have a substantially common ballistic trajectory. According to an aspect, the coast time of the interceptor stage will be sufficient to provide a mid-course correction as may be necessary. In another aspect, the interceptor will be controlled to perform a reconnaissance of an object of the target object cloud during at least a portion of the engagement time. During the engagement time, the interceptor may be controlled to execute one or more maneuvers, including a non-engagement maneuver, a non-destructive engagement, or a destructive engagement of an object of the target object cloud. According to another aspect, the accelerating stage of the interceptor used to match the target trajectory would occur near apogee of the target trajectory.

Embodiments of the invention as set forth herein will be fully understood with reference to the following detailed description, accompanying drawing figures, and as defined in the appended claims.

DETAILED DESCRIPTION OF A PREFERRED EMBODIMENT OF THE INVENTION

Figure 1:
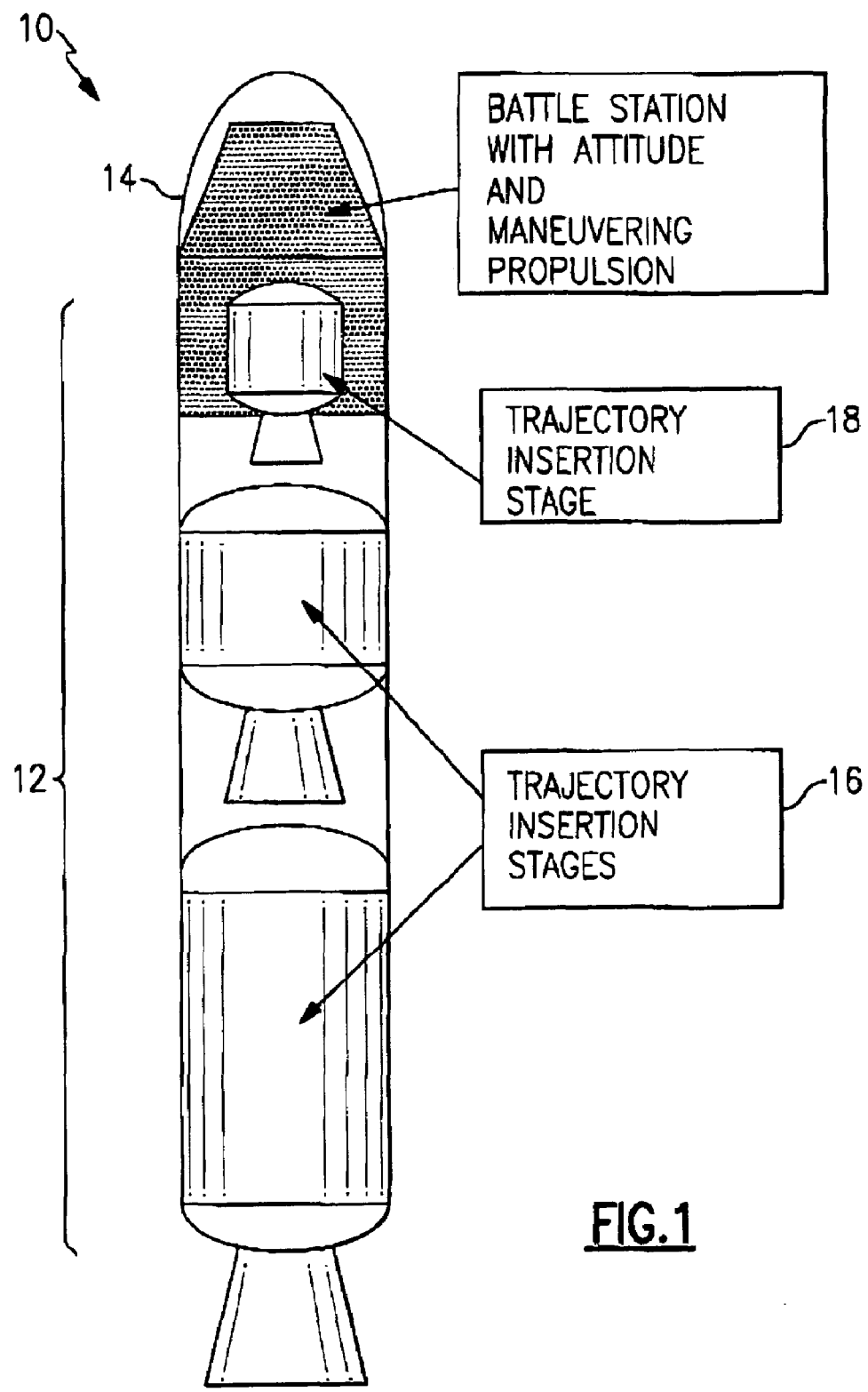
FIG. 1. is a schematic illustration of a multi-stage interceptor according to an embodiment of the invention.

An embodiment of the invention as illustrated in FIG. 1 is directed to a multi-stage interceptor 10 of a BMD system. In this and the other embodiments described and claimed herein, the intended ballistic target will typically be a missile such as an ICBM or a Multiple Independently targeted Reentry Vehicle (MIRV); however, the embodiments of the invention are not so limited. The interceptor 10 includes a propulsion portion 12 and a battle station portion 14 comprising command and control systems. The propulsion portion 12 further includes one or more lower, trajectory intercept stages 16 and an upper, trajectory insertion stage (or stages) 18 cooperatively engaged with each other and with the battle station stage 14. The battle station stage 14 can be equipped with attitude and orientation control systems, axial and translational maneuvering systems, reconnaissance systems, capture systems, destructive and non-destructive engagement systems, and command, control and communications systems, all of which are well known in the art. The multi-stage interceptor 10 is designed to precisely provide at least three distinct propulsive maneuvers. The lower, trajectory intercept stage (or stages) 16 are intended to provide sufficient propulsive capability to inject the upper stage (or stages) 18 and the battle station stage 14 into a trajectory that intercepts a target, such as a suspected hostile ballistic missile. The upper, trajectory insertion stage (or stages) 18 is intended to provide the necessary and precise interceptor speed change, $\Delta V$, to match the trajectory of the suspected hostile ballistic missile. Generally, the interceptor will possess a speed change capability, $\Delta V$, that is equal to or greater than about 10% more than a $\Delta V$ capability of the target. At the conclusion of the second propulsive phase of trajectory matching, the interceptor battle station 14 and the suspected hostile ballistic missile are on the same ballistic path with the battle station optimally positioned behind, under, above, in front of, along side of, within in, etc. relative to the target object cloud. Although, as will be described in greater detail below, the interceptor is intended to have a net zero velocity with respect to a target missile during an engagement time portion of the trajectory of the interceptor and the target missile, the battle station propulsion system should be capable of providing a sufficient speed or velocity change to enable maneuvering of the battle station in and/or around the target object cloud as described herein above. In an exemplary embodiment, the interceptor is envisioned as an existing C4 missile with the third-stage and warhead replaced by an Orbus 1A orbital injection engine (Pratt & Whitney Aircraft Company) and a battle station. The first and second-stages of the C4 missile have the capability to throw a 2,213 pound load into intercept orbit, while the Orbus 1A can accelerate an 825 pound battle station to ICBM trajectory.

Figure 2:
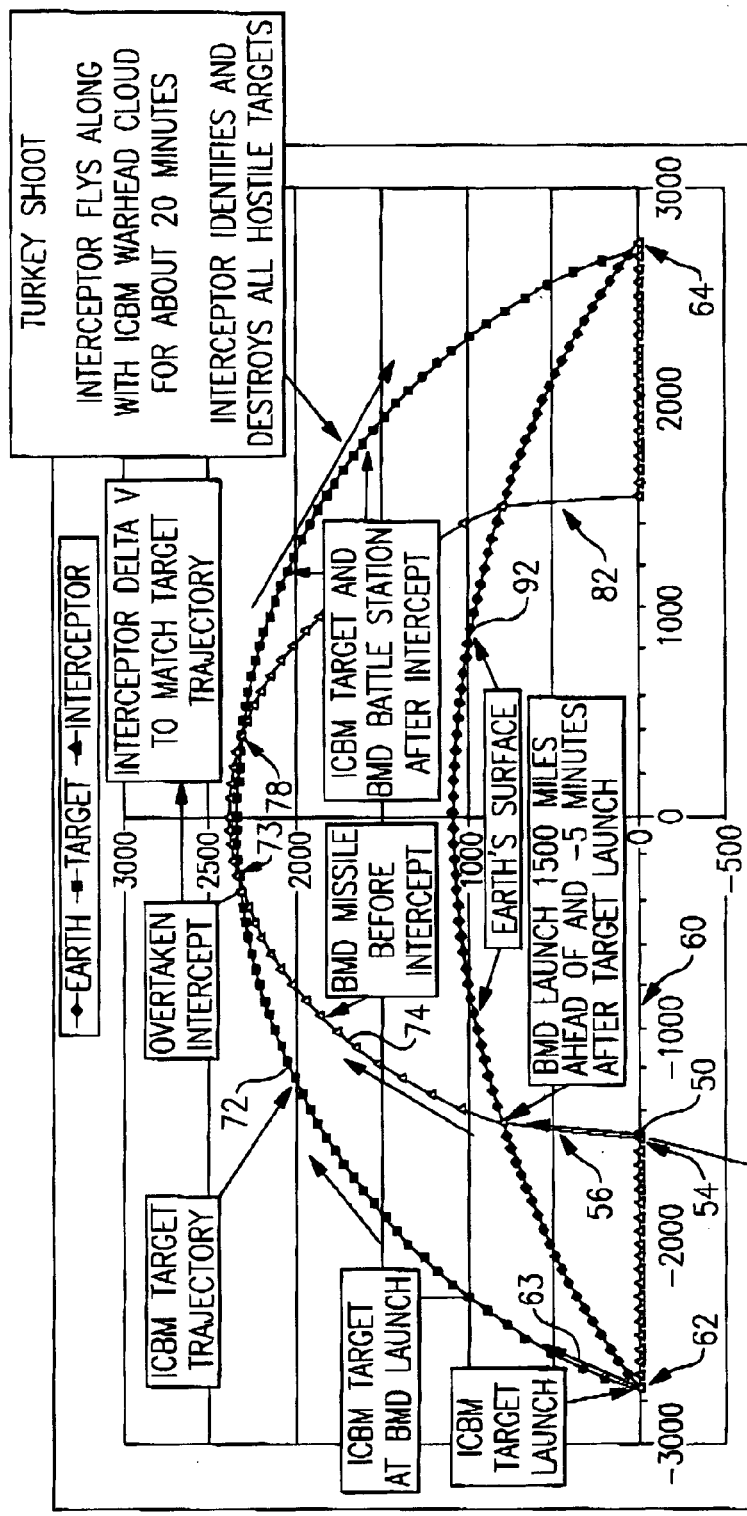
FIG. 2 is grid type illustration of trajectory scenarios in support of an embodiment of the invention.

Another embodiment according to the invention is directed to a ballistic missile defense system 50 shown schematically in the insert of FIG. 2. The system includes an interceptor launch platform 52 designed to launch an interceptor 10 described above. In an aspect of the embodiment, the launch platform 52 is a sea-based platform residing on or in a surface ship or alternatively in a submarine. In an alternative aspect, the launch platform 52 is a land-based platform, either mobile or stationary. In the mobile aspect of both the sea-based and land-based platforms, the interceptor launch platform 50 would optimally be located in a location that is equal to or less than between about one-quarter to one-third of the target missile ballistic range from the target missile launch point. As illustrated in FIG. 2, a target missile launch point 62 is located at a horizontal grid position of (−)3,000 units from a center, zero position, and has a ballistic range of 6,000 units between the launch point 62 and the termination point 64 located at the (+)3,000 unit grid mark in the Figure. As shown, the interceptor launch platform 50 is located at the (−)1,500 unit position, which, as illustrated, represents one-quarter of the target missile ballistic range. The interceptor launch platform 50 could be moved to point 66 on the horizontal grid at the (−)1,000 unit marker, which represents one-third of the target missile ballistic range. Movement within the range between the closer launch point 54 and the farther launch point 66 will result in a tradeoff with increased or decreased target launch warning time and interceptor/target missile engagement time as a person skilled in the art will readily understand. More generally, the interceptor launch location could be in a location range from proximate (i.e., very close to) the target launch point to an earth based location corresponding to, or even slightly past, the target trajectory mid-point. If close to the target launch point, the deployment requires very fast response to intercept the target trajectory but provides the longest possible engagement time thus enhancing the advantages of reconnaissance before attack, and maintaining an interceptor launch direction away-from the aggressor, according to the embodiments of the invention. When the interceptor launch point is at, or slightly past, the midpoint in the trajectory, the deployment provides a long response time but requires the highest speed change capability, ΔV, from the interceptor and offers the shortest engagement times.

In all of the embodiments described herein, and as illustrated by the interceptor launch trajectory portion 56 in FIG. 2, the interceptor is launched in the generally same direction 63 as that of the target missile. In this manner, according to embodiments of the invention, a non-provocative ballistic missile defense approach is adopted; that is, the interceptor is not launched towards the target missile launch point but rather in the generally same direction as the target missile, and toward the targeted territory.

Another embodiment according to the invention is directed to a method for ballistic missile defense, which is described below again with reference to FIG. 2. The method involves identifying a launched target ballistic missile having a target launch point 62, a target launch direction 63 and speed, and a target missile trajectory 72; launching an interceptor 10 from a forward based location 54 (66) in a launch direction 56 that is generally the same as the target launch direction and with a speed that is less than the target missile speed; providing the interceptor with an approximate target intercept trajectory 74; and accelerating the interceptor at an approximate point of intercept 78 to substantially match the target missile trajectory. In an aspect of the embodiment, the method further involves maneuvering the interceptor around and/or in a target object cloud for the purpose of inspecting, capturing, non-destructively engaging, and/or destructively engaging one or more objects of the target object cloud. As shown in FIG. 2, the interceptor has a total target intercept trajectory 82 ballistic range (−1500 to +1500 units) that is less than the ballistic range (−3000 to +3000 units) of the target missile. In an aspect according to the embodiment, the approximate point of intercept 78 is at a mid course trajectory of the launch target ballistic missile as shown in FIG. 2.

In another embodiment, a method for ballistic missile defense includes the steps of providing an interceptor having the capability to execute at least three propulsive maneuvers including: (a) injecting the interceptor into a trajectory that intercepts a targeted, launched target ballistic missile, (b) precisely changing the interceptor velocity as necessary to substantially match a trajectory of the targeted, launched target ballistic missile, and (c) selectively positioning the interceptor proximate a target missile object cloud, from a launch direction of the interceptor that is generally the same as the launch direction of the target missile. The action of precisely changing the interceptor velocity may include making any necessary plane change between the initial interceptor trajectory and the target ballistic missile trajectory. In this embodiment, the speed of the interceptor during the injection stage as illustrated at 56 and 74 in FIG. 2 is less than the in-flight speed of the target missile.

In another embodiment according to the invention, a method for ballistic missile defense includes the steps of identifying a launched target ballistic missile having a target launch direction 63; launching an interceptor 10 from a forward-based location 54 in a launch direction 56 that is generally the same as the target launch direction; allowing the interceptor, after some predetermined launch time, to coast without propulsion for a selected period of time; and accelerating the interceptor to substantially match the target missile trajectory such that the interceptor and the target missile have a substantially common ballistic trajectory for a given period, as illustrated in FIG. 2.

Various aspects of the method embodiments described herein above are set forth in the following exemplary embodiments.

An exemplary embodiment described with reference to FIG. 2 describes the trajectory aspects of a ballistic missile defense approach. As described herein, the ballistic missile defense approach entails a non-provocative scenario in which an interceptor is launched in the same direction as the target missile. As shown in FIG. 2, curve 92 represents the earth's surface, curve 72 represents a hostile ICBM trajectory, and part of the curve represented at 74 above the earth's surface is the initial trajectory of the launched interceptor. The exemplary mission begins with a hostile ICBM launch at launch point 62 on a 6,000 mile range trajectory. An interceptor launch platform 50 waits 1,500 miles down range at point 54. Approximately five minutes after target missile launch and thus well after target booster burnout (which allows time for accurate tracking, chain of command involvement and interceptor prelaunch preparations), the interceptor 10 is launched on roughly a 3,000 mile trajectory 74 that intercepts the target trajectory 72 at a point 78 selected by intercept command. In FIG. 2, a pre-apogee intercept 73 is selected to maximize the engagement time between the interceptor and the target missile, however the intercept point can be varied to optimize mission parameters. After interceptor lower-stage 16 burnout, the interceptor upper-stage 18 and battle station stage 14 coast for approximately 12 minutes before reaching the intercept point, which allows time for mid-course correction. At intercept, the target missile is traveling approximately 6,000 feet per second faster than the interceptor. The upper stage 18 of the interceptor is fired at intercept to accelerate the interceptor and match the trajectory of the target object cloud. At this point, both the target and the interceptor are on a common ballistic trajectory that continues for at least 10 minutes and up to approximately 20 minutes (depending upon the trajectory) before atmospheric reentry. During the long engagement time of between about 10–20 minutes, beginning approximately 20 minutes after the target missile launch, the interceptor battle station 14 can first identify and then, under clear command and control direction, destroy or otherwise engage the hostile target(s).

Figure 3:
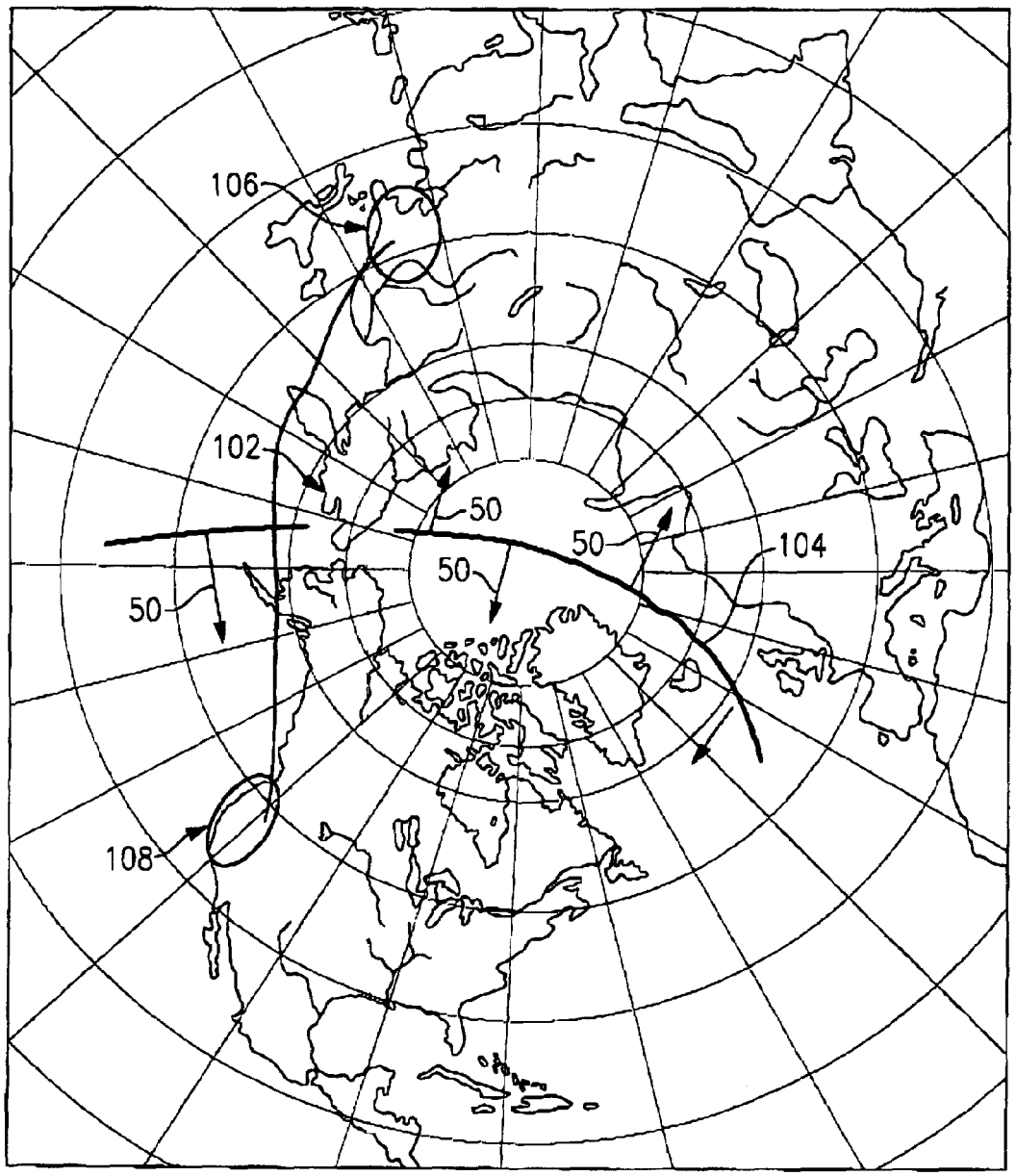
FIG. 3 is a world map polar view used to illustrate an exemplary embodiment of the invention.

Another exemplary embodiment is now described with reference to FIG. 3 and is illustrative of a global defense strategy. For the purpose of illustration only, the exemplary scenario describes a potential ICBM launch from the global vicinity 106 towards the coastal region 108, representing an approximately 6,000 mile ballistic range. In this scenario, the interceptor launch platform 50 is a submarine stationed either west or east of the Kamchaka Peninsula 102. With an interceptor having an acceptable speed change capability, ΔV, this launch platform location could intercept trajectories from the launch region 106 against the entire coastal region 108. On a larger defensive scale, a line of sea-based launch platforms extending from the North Pacific through the Arctic to the North Atlantic as illustrated by line 104 would provide a ballistic missile defense shield against hostile ICBM launch points across the entire continents of Asia, Europe and Africa.

The ballistic missile defense methods described herein present a shift in the approach to ballistic missile defense. The trajectory matching approach to ballistic missile defense of the instant embodiments trades the kinetic energy advantages and technical challenges of frontal ICBM warhead intercept for the long (10 minute to 20 minute) engagement time advantages of tail chase intercept. Tail chase ICBM intercept traps the hostile target missile with the interceptor on a 10+minute fixed ballistic trajectory, and achieves four key engagement advantages critical in air combat: (1) long engagement time, (2) low relative velocity for a ballistic, non-maneuvering target, (3) optimum engagement distance, and (4) optimum engagement orientation (which, depending upon mission parameters, may be above, below, along side of, in front of, or below) under the control of the maneuvering interceptor battle station and remote central command. These engagement advantages not only promote a higher kill probability, but also provide the opportunity for enhanced command and control by providing the time, distance and orientation for detailed and extended reconnaissance before ordering an attack, and then between repeated attacks as needed to ensure complete verified target destruction.

The embodiments described herein provide a non-provocative approach to ballistic missile defense. The interceptor is launched towards friendly (i.e. defended target) territory and away from the territory and launch points of the apparent adversary. A relatively long engagement time provides that the interceptor launch is initially only a reconnaissance mission and not a combat mission, making the approach operationally similar to manned aircraft inspection of a suspected aircraft threat. The embodied invention also provides a relatively long launch warning time that minimizes unnecessary interceptor launches. Launch warning time can be increased by moving the interceptor launch point further from the target launch point, however at the expense of decreased engagement time. Interceptor launch platform distance from the target launch site can also be extended by trading increased launch warning time for reduced engagement time.

Although the exemplary embodiments present a defense against a 6,000 mile range ICBM, where the target missile flight time is about 40 minutes and the interceptor engagement time is about 20 minutes, "theater BMD," where ballistic missile ranges can be as short as a few hundred miles, are also contemplated. Ballistic distances in this range still require several minutes of flight time. The embodied systems and methods can be applied against these quasi-tactical threats, and all ranges in between, as long as the interceptor launch point can be located approximately one-quarter to one-third of the target missile range from its launch point, which provides engagement times roughly equal to one-half of the target missile flight time.

The embodied methods include reconnaissance, capture, or destructive and/or non-destructive engagement of hostile targets such as ICBMs or MIRVs, for example. MIRV targets have the ability to launch multiple warheads with a single missile and then precisely adjust the trajectory of each warhead to hit a different target within a limited overall impact footprint. In general, frontal intercept scenarios require a separate interceptor for each target because the number and distribution of the MIRV warhead cloud are uncertain. Embodiments of the instant invention provide the time and functionality for a single interceptor to sequentially intercept, inspect and destroy multiple targets thus allowing a single interceptor to potentially destroy all of the MIRV warheads from a single missile. Alternatively, the close engagement and resulting docking capability of the instant BMD embodiments offer the potential to actually capture and redirect the trajectory of the target either before destroying the target or in place of destroying the target. For example, the interceptor could capture and accelerate an ICBM target to orbital velocity and hold the target in orbit for more detailed inspection and as evidence of a hostile action of an aggressor. For any target, destruction mitigates the effect of the warhead, but spreads debris over a broad impact area. Potential nuclear debris which would likely survive reentry, or biological or chemical debris, which potentially could survive reentry, would still present a threat. Warhead capture early in the trajectory enables the interceptor to decelerate the target to decrease its range, accelerate the target to increase its range or laterally divert the target before destruction (or in lieu of destruction) so that its debris either lands in water or in a low populated area.

The foregoing embodiments and aspects of the invention are disclosed herein by way of examples only and are not intended to limit the scope of the present invention, which is solely defined by the appended claims. A person of ordinary skill in the art will appreciate many variations and modifications within the scope of this invention.

I claim:

1. An interceptor, comprising:
   a multi-stage launchable vehicle including at least one propulsion stage and capable of at least three distinct propulsive maneuvers including
   a) a lower trajectory stage for putting a stage of the interceptor into a trajectory of the same general direction as that of a launched, ballistic target so as to achieve an approximate intercept therewith;
   b) an upper trajectory stage for precisely changing the interceptor velocity as necessary to substantially match a trajectory of the target; and
   c) a positioning stage for selectively positioning the interceptor proximate a target object cloud.

2. The interceptor of claim 1, wherein the target is a missile.

3. The interceptor of claim 2, wherein the missile is an ICBM.

4. The interceptor of claim 1, wherein the interceptor has a speed change capability, ΔV, that is equal to or greater than about 10% more than a ΔV capability of the target.

5. The interceptor as set forth in claim 1 wherein said vehicle includes a battle station stage that includes an attitude control and a propulsion system providing a sufficient velocity change capability to move the battle station stage around and within the target object cloud.

6. The interceptor as set forth in claim 5 wherein the maneuvering step includes a further step of:
   inspecting the target object cloud and further capturing, non destructively engaging or destructively engaging one or more objects of the target object cloud.

7. The interceptor as set forth in claim 1 and including an interceptor launch platform, wherein the interceptor launch platform is located in a location range from proximate a target launch point to approximately a midpoint target trajectory location.

8. A ballistic target defense system, comprising:
   an interceptor launch platform designed to launch a multistage interceptor; and
   a multistage interceptor with a first stage capable of being launched from the launch platform, whereupon launch, the interceptor has a launch direction that is the same general direction as a launch direction of a launched ballistic target and a second stage for precisely changing the interceptor velocity as necessary to substantially match a trajectory of the ballistic target.

9. The ballistic target defense system of claim 8, wherein the interceptor includes at least one propulsion stage and a battle station stage, further wherein the interceptor is capable of at least three distinct propulsive maneuvers including:
   a positioning stage for selectively positioning the interceptor proximate a target object cloud.

10. The ballistic target defense system of claim 9, wherein the battle station stage includes an attitude control and a translational propulsion system providing a sufficient velocity change capability to maneuver the battle station stage around and within a target object cloud.

11. The ballistic target defense system of claim 9, wherein the battle station stage includes a control system allowing for a non-engagement maneuver, a non-destructive engagement, and a destructive engagement of an object in a target object cloud.

12. The ballistic target defense system of claim 8, wherein the interceptor launch platform is located in a location range from proximate a target launch point location to approximately a mid point target trajectory location.

13. The ballistic target defense system of claim 8, wherein the interceptor launch platform is located in a location that is equal to or less than between about one-quarter to one-third of the target ballistic range from a target launch point location.

14. The ballistic target defense system of claim 8, wherein the location of the interceptor launch platform is operationally movable so as to increase a target launch warning time and decrease an engagement time as a function of increased distance of the interceptor launch platform from a target launch point location, and vice-versa.

15. The ballistic target defense system of claim 8, wherein the interceptor launch platform is a sea-based platform.

16. The ballistic target defense system of claim 8, wherein the interceptor launch platform is a land-based platform.

17. The ballistic target defense system of claim 8, wherein the target is a missile.

18. The ballistic target defense system of claim 17, wherein missile is an ICBM.

19. A method for ballistic target defense, comprising:
   identifying a launched ballistic target having a target launch point, a target launch direction, a target speed, and a target trajectory;
   launching a multistage target interceptor in a launch direction that is generally the same as the target launch direction, and with a speed that is less than the target speed;
   providing a stage of the interceptor with an approximate target intercept trajectory; and
   accelerating a stage of the interceptor at an approximate point of intercept to substantially match the target trajectory.

20. The method of claim 19, further comprising:
   maneuvering a stage of the interceptor around and/or in a target object cloud for one of an object inspection, an object capture, a non-destructive object engagement, and a destructive object engagement.

21. The method of claim 19, wherein maneuvering the interceptor comprises obtaining at least one of a desired distance and a desired orientation with respect to the target object cloud.

22. The method of claim 19, wherein the approximate target intercept trajectory has a ballistic range that is less than the target ballistic range.

23. The method of claim 19, further comprising providing the interceptor with a target engagement time during which a stage of the interceptor has approximately a zero net relative engagement velocity.

24. The method of claim 23, further wherein the stage of the interceptor is controlled to have an optimal engagement distance and an optimal engagement attitude.

25. The method of claim 23, wherein the engagement time is approximately equal to or less than approximately one-half of the flight time of the target.

26. The method of claim 19, comprising launching the multistage target interceptor from a forward-based location.

27. The method of claim 26, wherein the forward-based launch location is equal to or less than between about one-quarter to one-third of the target ballistic range from the target launch point.

28. The method of claim 27, comprising selecting the forward-based launch location as a function of increasing/decreasing a target launch warning time and an interceptor engagement time.

29. The method of claim 19, wherein the approximate point of intercept is at a midcourse trajectory of the launched ballistic target.

30. The method of claim 19, wherein the target is a missile.

31. The method of claim 30, wherein missile is an ICBM.

32. A method for ballistic target defense, comprising:
providing a multistage interceptor having a capability to execute at least three propulsive maneuvers, including:
a) injecting a stage of the interceptor into a trajectory that is in the same general direction as that of a launched ballistic target;
b) precisely changing the interceptor velocity as necessary to substantially match a trajectory of the launched ballistic target; and
c) selectively positioning the interceptor proximate a target object cloud,
wherein the multistage interceptor is launched in a direction that is the same general direction as the launch direction of the target.

33. The method of claim 32, wherein selectively positioning the interceptor comprises providing a stage of the interceptor with attitude control and translation propulsion sufficient to maneuver the stage around and within the target object cloud.

34. The method of claim 32, wherein selectively positioning the interceptor proximate a target comprises selectively maneuvering a stage of the interceptor in front of, behind, above, below, or alongside of the target object cloud.

35. The method of claim 32, wherein precisely changing the interceptor velocity comprises making any necessary plane change between the initial interceptor trajectory and the target trajectory.

36. The method of claim 32, further comprising at least one of inspection, capture, non-destructive engagement, and destructive engagement of an object in the target object cloud.

37. The method of claim 32, comprising providing the interceptor with an injection stage speed that is less than the speed of the target.

38. The method of claim 32, wherein the target is a missile.

39. The method of claim 32, wherein missile is an ICBM.

40. A method for ballistic target defense, comprising:
identifying a launched ballistic target having a target launch direction;
launching a multistage interceptor in a launch direction that is the same general direction as the target launch direction;
allowing a stage of the interceptor to coast without propulsion for a period of time;
accelerating a stage of the interceptor to substantially match the target trajectory, wherein the interceptor and the target have a substantially common ballistic trajectory.

41. The method of claim 40, comprising launching the multistage target interceptor from a location that is located in a range from proximate a target launch point location to approximately a mid point location of the target trajectory.

42. The method of claim 41, comprising launching the multistage target interceptor from a forward based location.

43. The method of claim 40, comprising allowing the inceptor to coast for a time sufficient to provide a mid-course correction.

44. The method of claim 40, further comprising performing a reconnaissance of an object of a target object cloud.

45. The method of claim 44, further comprising executing at least one of a non-engagement maneuver, a non-destructive engagement, and a destructive engagement of the object.

46. The method of claim 40, wherein accelerating a stage of the interceptor to match the target trajectory occurs near apogee of the target trajectory.

47. The method of claim 40, wherein the target is a missile.

48. The method of claim 47, wherein missile is an ICBM.

* * * * *

UNITED STATES PATENT AND TRADEMARK OFFICE
CERTIFICATE OF CORRECTION

| | | |
|---|---|---|
| PATENT NO. | : 7,137,588 B2 | Page 1 of 1 |
| APPLICATION NO. | : 10/752055 | |
| DATED | : November 21, 2006 | |
| INVENTOR(S) | : John Morgan Humphrey | |

It is certified that error appears in the above-identified patent and that said Letters Patent is hereby corrected as shown below:

Column 12, Line 3, relating to Claim 39, the number "32" is incorrect, please replace with the number --38--.

Signed and Sealed this

Twentieth Day of February, 2007

JON W. DUDAS
*Director of the United States Patent and Trademark Office*